United States Patent [19]

Herrera

[11] Patent Number: 4,962,528

[45] Date of Patent: Oct. 9, 1990

[54] BEEPER AMPLIFIER

[76] Inventor: Juan H. Herrera, 332 SW. 6 St., Miami, Fla. 33130

[21] Appl. No.: 355,226

[22] Filed: May 22, 1989

[51] Int. Cl.[5] .............................................. H04M 1/72

[52] U.S. Cl. ................................ 379/442; 340/311.1; 379/57; 379/372; 379/386

[58] Field of Search ................ 340/825.44, 311.1, 306, 340/825.15; 379/57, 386, 355, 373, 372, 376, 442; 455/347, 351, 228

[56] References Cited

U.S. PATENT DOCUMENTS 4,301,335 11/1981 Jucker ................................ 379/376
4,462,030 7/1984 Ishii .
4,578,540 3/1986 Borg et al. ............................ 379/40
4,806,906 2/1989 Oda et al. ......................... 340/311.1

FOREIGN PATENT DOCUMENTS 0263666 4/1988 European Pat. Off. .............. 379/57
0002472 1/1984 Japan .................................. 379/376

OTHER PUBLICATIONS

"Telephone Bell Repeater", B. Barnard, Practical Wireless, vol. 55, No. 8, Aug. 1979, pp. 34–36, 58.

*Primary Examiner*—Jin F. Ng
*Assistant Examiner*—Randall S. Vaas
*Attorney, Agent, or Firm*—J. Sanchelima

[57] ABSTRACT

An amplifier in a housing for receiving and detecting the presence of portable paging devices that produce an audible signal when activated. The amplifier allows the connection of a large capacity annunciator or visual alarm. Circuitry is provided to connect the output of the amplifier to the bell of conventional telephone sets without affecting its normal operation. The telephone set bell can be activated with a voltage signal different from the one it normally generates so that a user can distinguish the two calls.

6 Claims, 3 Drawing Sheets

BEEPER AMPLIFIER

BACKGROUND OF THE INVENTION

1. Field of the Invention.

The present invention relates to amplifiers for beepers.

2. Description of the Related Art.

A typical beeper user carries the portable, battery-operated device with him during the day and when he arrives at his or her home, the beeper is usually one of the first items that are removed from the user. Not infrequently, a beeper goes off and the user cannot hear it because he or she is in another room or in another remote area. The annunciators or alarms conventionally found in beepers fail to address this problem. One of these reported usages is found in U.S. Pat. No. 4,462,030 where annunciators and LED alarms are disclosed. However, it does not disclose a housing for receiving beepers and generating a louder signal or in any way interfacing with a conventional telephone set.

Also, it is now common to find car alarms activators with paging devices to alert a user of the violation of his or her alarm system. These devices are limited by the audible or visual signal generated that requires the user to be in the proximity of the paging device.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a device that cooperatively receives conventional portable beepers and amplifies the audible signal produced in response to a telephone call.

It is another purpose of the present invention to provide such a device that can selectively activate the bell of a telephone set with the same or a different tone from what it customarily sounds.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
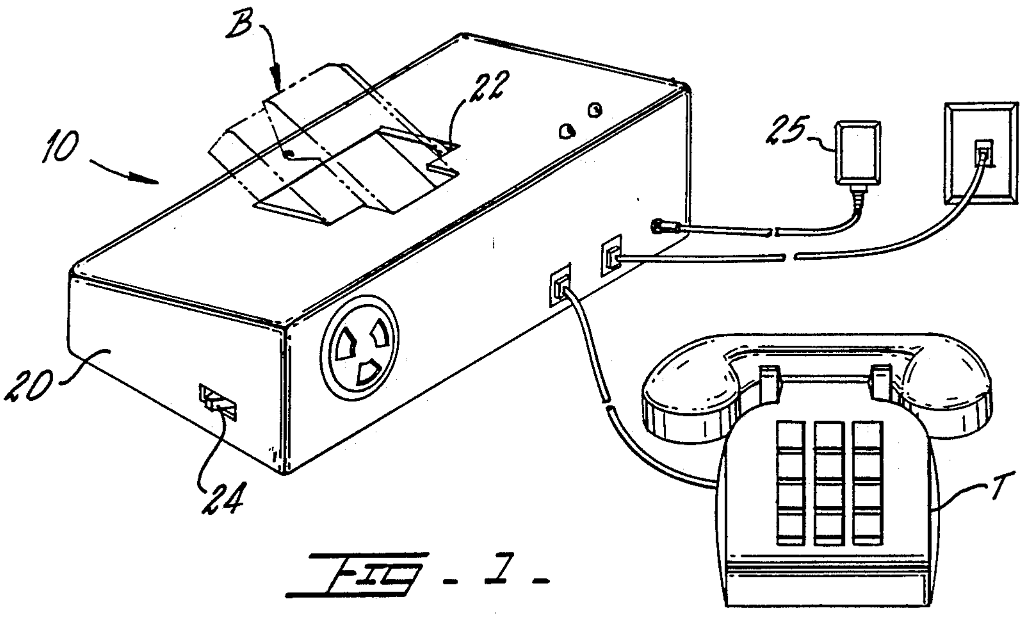
FIG. 1 represents an implementation of the beeper amplifier incorporating the teachings of the present invention and including connections to a telephone set and to the telephone public network.

Referring now to FIG. 1, where the present invention is generally referred to with numeral 10, it can be observed that it basically includes a housing 20 that includes an opening 22 where a portable beeper B is cooperatively received. Opening 22 is sufficiently large to receive beepers B of different sizes. A sensor switch 15 is cooperatively mounted inside housing 20 to sense the presence of beeper B and switch 15 closes when there is at least one beeper B. Housing 20 can bew designed to accomodate more than one beeper B. A power switch 24 is provided to turn on and off amplifier 10 which is preferably connected to a battery power supply to enhance its portability but it can also be connected to an AC supply 25, or both. A telephone set T is optionally connected to amplifier 10, in the preferred embodiment, to provide the means for selectively using its bell with the same tone, or with a different one, depending on the signal generated by alternating voltage supply circuitry 40.

Figure 2:
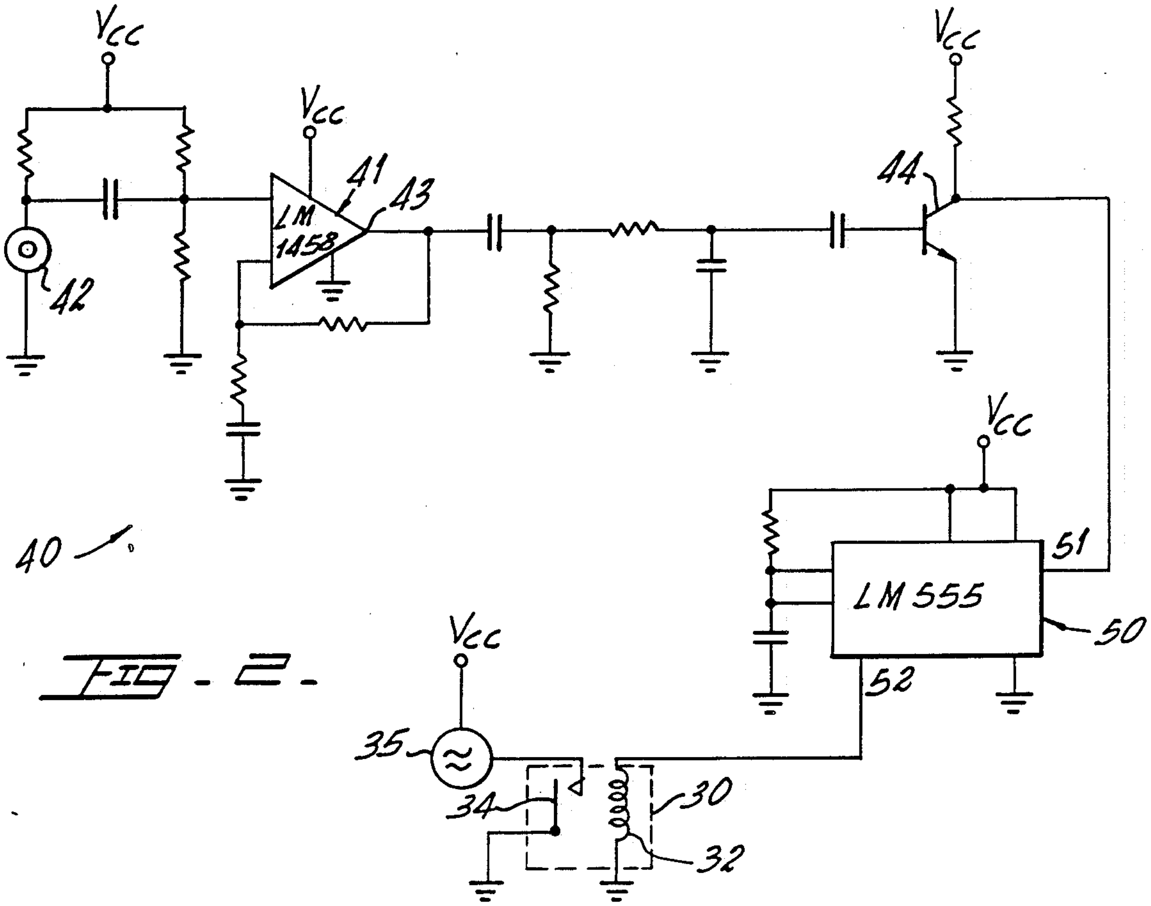
FIG. 2 shows a schematic representation of the circuitry utilized in the present invention for one of the preferred embodiments being implemented with an audio amplifier.
Figure 3:
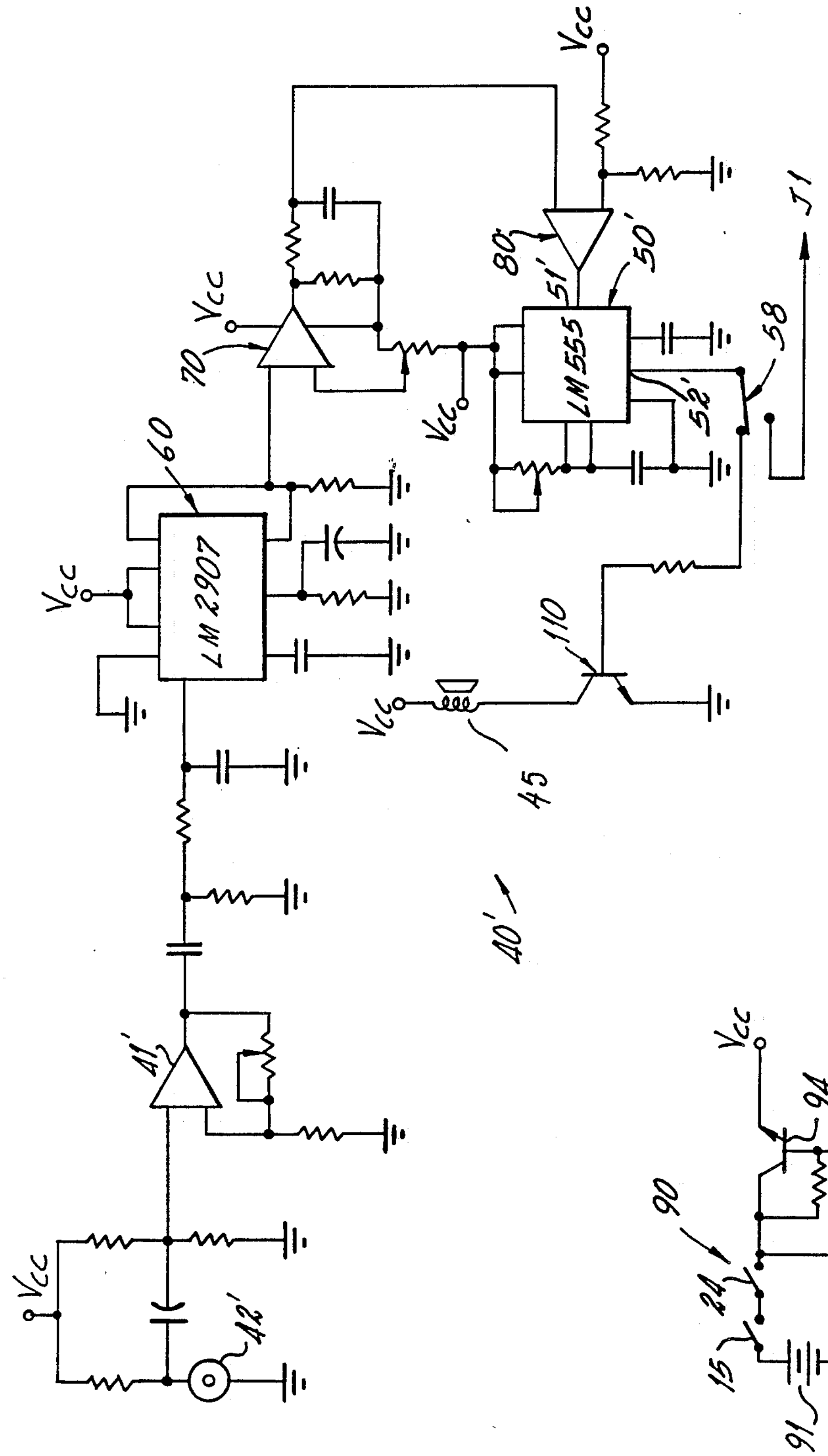
FIG. 3 represents a schematic representation of an alternate embodiment adding frequency filtering and discrimination circuitry.

As seen in FIGS. 2 and 3, circuitry 40 and 40′ includes a transducer or pickup device 42 that translates the audible signal typically emitted by a paging device or beeper B into an electrical signal that can be processed. The signal picked up by device 42 is passed through a passive filter to operational device 41 which is implemented with an LM1458 integrated circuit manufactured by National Semiconductors, Inc., in the preferred embodiment. Output 43 of operational amplifier 41 is then fed to switching transsistor 44 which produces a low voltage when triggered. This low signal in turn goes to input 51 of timer device 50 to produce an output 52 which, in the preferred embodiment, is a high voltage capable of activating coil 32 of relay 30 thereby closing its contacts 34 and closing the circuit for alarm device 35 to be active. Alarm device 35 may be either a visual (LED) or aural device (annunciator, buzzer, etc.) with a larger audio generating capacity than what is typically found in conventional beepers. Also, it is possible to selectively activate the bell found in telephone set T through the circuitry shown in FIG. 4 as explained in the alternate embodiment below.

As seen in an alternate embodiment in FIG. 3, the signal picked up by device 42′ can be applied, after passing through passive filters and being amplified by operational amplifier 41′ like in the circuit represented in FIG. 2, to a frequency discriminating integrated circuit 60, preferably implemented with a National Semiconductor's integrated circuit LM2907, which is a frequency to voltage converter. The output from IC 60 is compared to a reference voltage by comparator device 70, implemented with a LM 1458, thereby producing a predetermined output voltage level if the paging device's audible signal was detected. This output voltage level is then applied through driver 80 to drive a monostable multivibrator 50′ which is preferably implemented with what is commonly known as a 555 timer IC. Timer 50′ is set to produce a suitable waveform that is fed through driving transistor 110 to a high capacity annunciator device 45 thereby emitting a desired sound.

This alternate embodiment is less suitable to generating feedback signals that would interfere with the operation of beeper amplifier 10.

Figure 3A:
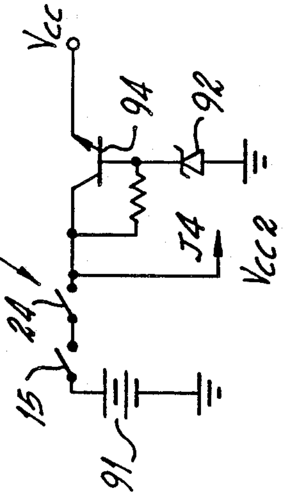
FIG. 3A is a schematic representation of the preferred embodiment for providing the supply voltages utilized in the circuits used in this application.

In FIG. 3A, a power supply circuit 90 is represented to provide the Vcc voltage required by circuits 1 and 3 and the Vcc2 required if the optional connection to telephone set T is utilized. Basically, circuit 90 includes a battery 91 or rectified and filtered voltage source from transformer 25, that is connected in series with power switch 24. Voltage Vcc2 is tapped directly from the other contact of switch 24 and in the preferred embodiment is in the neighborhood of 18 volts. Also, this voltage is passed through transistor 94 in a common base configuration and a zener diode 92 that clamps the output voltage to about 9 volts and is used as Vcc.

Figure 4:
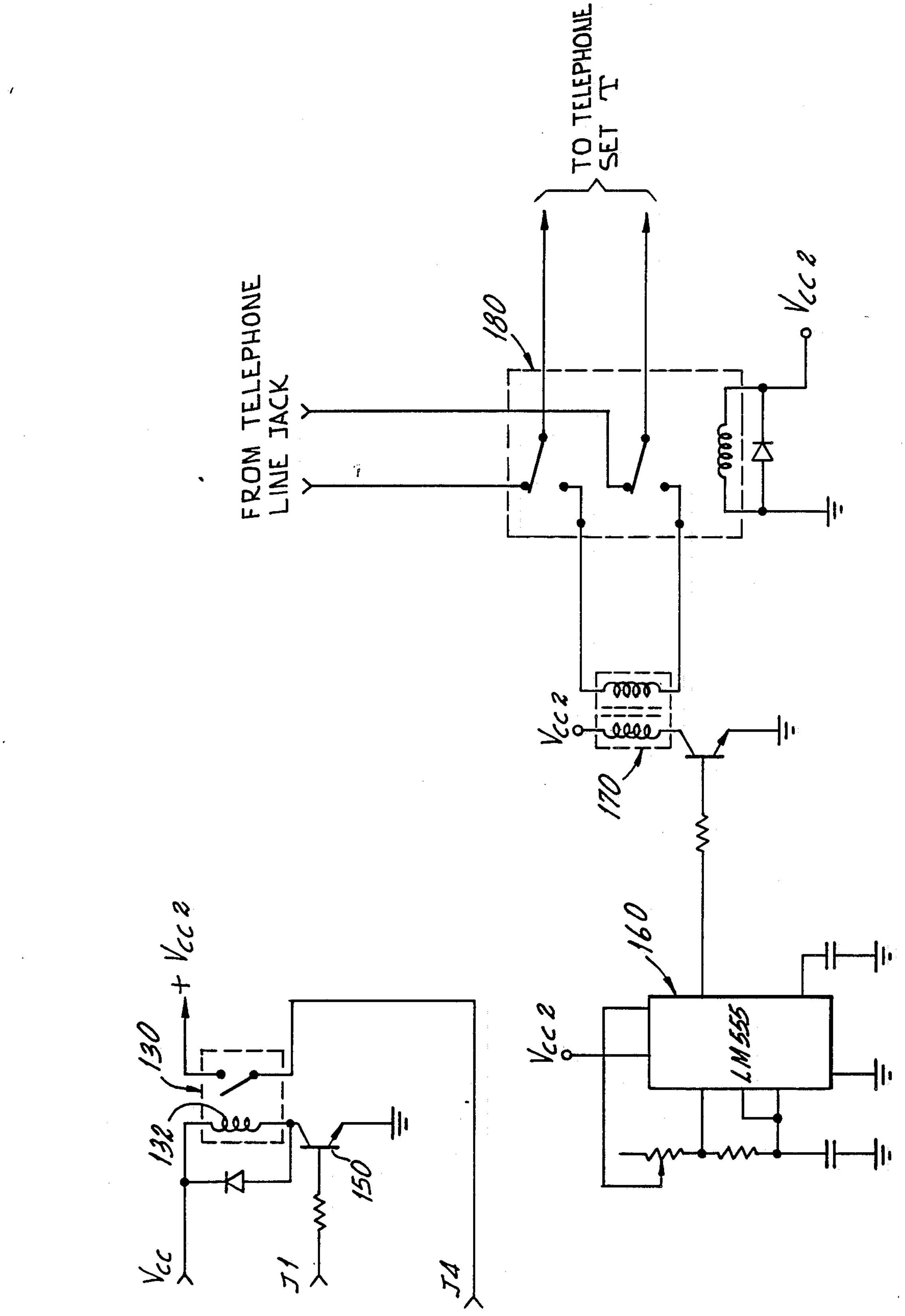
FIG. 4 shows a schematic representation of the circuitry for alternatively and selectively connecting the device represented in FIGS. 1 and 3 to a telephone set.

In FIG. 4, an additional feature of the present invention provides for the use of the bell in telephone set T. Vcc2 is the supply voltage obtained form battery 91 or rectified transformer 25 shown, or equivalent means, and in the preferred embodiment corresponds to about 18 volts. This voltage is applied to jack J4 and through relay 130 to the circuit shown in FIG. 4 when there is a signal in jack J1 when switch 58 is connected to activate telephone set T. From FIG. 3 it can be seen that double pole single throw switch 58 has to be in the phone position for the signal from the output of IC 50' to be present. This signal in turn is fed through driving transistor 150 to the activating coil 132 of relay 130 thereby allowing Vcc2 to be applied to the circuit of FIG. 4. A 555 timer 160 is used to generate an alternating voltage that is transmitted to step up transformer 170 so that a suitable voltage level can be achieved to drive the bell of telephone set T. To accomplish this, relay 180 has two double pole double throw switch and the output from transformer 170 is applied to one of the poles of each of the two switches and the other pole is connected to the tip and ring lines of the telephone jack connected to the public network. The other ends of the two switches are connected to the tip and ring connections of telephone set T. Normally, the tip and ring lines of the public network and the telephone set T are connected. It is only when Vcc2 is applied to the circuit of FIG. 4 that IC160, transformer 170 and relay 180 are activated causing the generated stepped up alternating voltage to be applied to the bell of telephone set T and this occurs when there is a high output voltage at 52' that is transmitted through jack J1. The waveform generated by IC 160 can be designed so that it creates a bell sound that is different from the one heard from a conventional telephone call so that a user may distinguish the two calls.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. An amplifier for portable paging devices producing an audible signal when activated and selectively connected with the tip and ring lines of a telephone set including a bell for connection to the public network, comprising:

A. housing means for receiving at least one of said paging devices and further including means for detecting the presence of at least one of said devices;

B. electrical amplifier means for picking up and amplifying said audible signal and producing an amplified output voltage;

C. means for supplying a voltage signal capable of driving said bell, having an input connected to said amplified output voltage and further having a voltage signal output connected to the tip and ring lines of said telephone set so that said voltage signal drives said bell in response to the application of said amplified output voltage at the input of said means for supplying a voltage signal which in turn is generated only when an audible signal is emitted by said paging device.

2. The amplifier set forth in claim 1, further comprising:

D. first switch means for selectively interrupting the connection between said amplified output and the input of said means for supplying a voltage signal.

3. The amplifier set forth in claim 2 wherein said first switch means include a two pole, single throw switching device connected to said amplified output so that the latter is selectively connected to each one of said poles and one of said poles being connected to the input of said means for supplying a voltage signal; and E. annunciator means having an input connected to the other pole of said switching device.

4. The amplifier set forth in claim 3, further comprising:

F. relay means having second switch means activated by a solenoid input, and said second switch means selectively and alternatively connect the tip and ring lines of said telephone set to the tip and ring lines of the public network and to said voltage signal output.

5. The amplifier set forth in claim 1 wherein said amplifier means includes a frequency discriminating circuit for filtering out substantialy only the frequency generated by said paging devices.

6. The amplifier set forth in claim 1 wherein said means for supplying an voltage selectably provides a plurality of predetermined waveforms with different durations.

* * * * *